United States Patent [19]

Yotsuyanagi et al.

[11] Patent Number: 4,631,177

[45] Date of Patent: Dec. 23, 1986

[54] METHOD FOR RECOVERING GALLIUM

[75] Inventors: Takao Yotsuyanagi, Miyagi; Yoshinobu Nishiyama, Kitakyushu, both of Japan

[73] Assignee: Mitsubishi Chemical Industries Ltd., Tokyo, Japan

[21] Appl. No.: 751,211

[22] Filed: Jul. 2, 1985

[51] Int. Cl.[4] ............................................. C01G 15/00
[52] U.S. Cl. ........................... 423/112; 423/DIG. 14; 75/101 BE
[58] Field of Search ....................... 423/112, DIG. 14; 75/101 BE

[56] References Cited

U.S. PATENT DOCUMENTS

| | | |
|---|---|---|
| 3,971,843 | 7/1976 | Helgorsky et al. ................. 423/112 |
| 4,015,230 | 9/1977 | Miyauchi ............................ 423/112 |
| 4,222,892 | 9/1980 | Motojima et al. .......... 423/DIG. 14 |
| 4,406,865 | 9/1983 | Fuller .......................... 423/DIG. 14 |
| 4,500,494 | 2/1985 | Scher .......................... 423/DIG. 14 |

Primary Examiner—H. T. Carter
Attorney, Agent, or Firm—Oblon, Fisher, Spivak, McClelland & Maier

[57] ABSTRACT

A method for recovering gallium from an aqueous solution containing gallium, which comprises contacting the aqueous solution containing gallium to a porous polymer having a water-insoluble substituted quinolinol retained therein, to let the polymer adsorb gallium, and then eluting gallium from the polymer.

6 Claims, No Drawings

METHOD FOR RECOVERING GALLIUM

BACKGROUND OF THE INVENTION

1. FIELD OF THE INVENTION

The present invention relates to a method for recovering gallium. More particularly, it relates to a method for advantageously recovering gallium from a strongly basic aqueous solution such as an aqueous sodium aluminate solution formed by a Bayer process.

2. DESCRIPTION OF THE PRIOR ART

It is known that gallium is contained in bauxite in an amount of from 0.002 to 0.01%. In the process for the production of alumina by a Bayer process, an alkali is recycled for repeated use, and a substantial amount of gallium is contained in the aqueous sodium aluminate solution formed in this process. An amalgamation method has been known as a method for recovering gallium from the aqueous sodium aluminate solution formed by this Bayer process. In recent years, a liquid-liquid extraction method has been developed as a superior method which will take the place of the amalgamation method. According to this method, gallium is extracted from the aqueous sodium aluminate solution containing gallium by means of an extracting agent prepared by dissolving a water-insoluble substituted quinolinol such as 7-(2-vinyl-3,3,5,5-tetramethylhexyl)-8-quinolinol in an organic solvent, and then the extracting agent containing gallium is reversely extracted with an aqueous acid solution to recover gallium (Japanese Unexamined Patent Publication No. 32411/1976). This method is practically useful as an industrial method, but it has a drawback that the substituted quinolinol in the extracting agent is susceptible to degradation. As a method for overcoming this drawback, there has been proposed a method wherein a quinolinol substituted by an alkyl group instead of the alkenyl group is used (Japanese Unexamined Patent Publication No. 52289/1978), or a method wherein the operation is conducted in an inert atmosphere (Japanese Unexamined Patent Publication No. 40212/1979).

SUMMARY OF THE INVENTION

The present inventors have conducted a research to develop a method for recovering gallium in an industrially more advantageous manner than these liquid-liquid extraction methods, and as a result, have found that when the water-insoluble substituted quinolinol used in these liquid-liquid extraction methods is supported on a porous polymer, such a porous polymer exhibits excellent adsorptivity for gallium. Further, it has been unexpectedly found that the substituted quinolinol fixed in this porous polymer does not undergo degradation very much even if repeatedly used for the recovery of gallium from the aqueous sodium aluminate solution. The present invention has been accomplished on the basis of this discovery, and presents a totally new method which may be called an impregnated resin method.

Namely, the present invention provides a method for recovering gallium from an aqueous solution containing gallium, which comprises contacting the aqueous solution containing gallium to a porous polymer having a water-insoluble substituted quinolinol retained therein, to let the polymer adsorb gallium, and then eluting gallium from the polymer.

DETAILED DESCRIPTION OF THE INVENTION

Now, the present invention will be described in detail with reference to the preferred embodiments.

The present invention is concerned with a method for separating gallium in an aqueous solution by the adsorption with a solid adsorbing agent. The present invention is particularly useful for the recovery of gallium from a strongly basic aqueous solution, usually a strongly basic aqueous solution having a pH of at least 10. A typical representative of such a strongly basic aqueous solution containing gallium is an aqueous sodium aluminate solution formed by a Bayer process. As is well known, in the Bayer process, bauxite is treated with an aqueous sodium hydroxide solution to form an aqueous sodium aluminate solution. This aqueous sodium aluminate solution is then subjected to hydrolysis, whereby a part thereof is converted to aluminum hydroxide and sodium hydroxide. The formed aluminum hydroxide is separated, and the remaining aqueous sodium aluminate solution containing sodium hydroxide is adjusted for its concentration and used again for the treatment of bauxite. The aqueous sodium aluminate solution after the separation of aluminum hydroxide is composed, for instance, of from 150 to 200 g/liter of $Na_2O$, from 70 to 100 g/liter of $Al_2O_3$ and about 200 mg/liter of gallium. The present invention can be advantageously applied for the recovery of gallium from such an aqueous sodium aluminate solution.

In the present invention, various types of conventional polymers may be used as the porous polymer useful as the carrier for the substituted quinolinol. It is usual to employ a porous polymer having a pore volume of from 0.1 to 2 ml/g, preferably from 0.3 to 1.2 ml/g as measured by mercury injection method, and an internal surface area of at least 10 $m^2/g$, preferably from 50 to 800 $m^2/g$ as measured by BET method. Such porous polymers may be produced by various methods. However, they are usually prepared by the copolymerization of a monovinyl compound with a polyvinyl compound, or polyvinyl compounds with one another, or by the homopolymerization of a polyvinyl compound. As such vinyl compounds, there may be mentioned hydrocarbons such as styrene, methylstyrene, vinylnaphthalene, butadiene or piperylene; styrene derivatives such as chlorostyrene, nitrostyrene or aminostyrene; acrylonitrile derivatives such as acrylonitrile, methacrylonitrile or α-acetoxy-acrylonitrile; acrylic acid, methacrylic acid and esters thereof; divinyl benzene, divinyl toluene, divinyl xylene, divinyl naphthalene, divinyl ethylbenzene, divinyl sulfone, divinyl ketone, divinyl furan, divinyl pyridine, diallyl phthalate, diallyl succinate, ethylene glycol dimethacrylate, diallyl amine, and N,N'-ethylene bisacrylamide. As a method for producing porous polymers from these vinyl compounds, it is usual to employ a conventional precipitation solvent method or a linear polymer co-existence method. In the precipitation solvent method, the monomer is dissolved in a solvent which is capable of dissolving the monomer, but incapable of dissolving the homopolymer, and then subjected to suspension polymerization in the presence of a suitable polymerization initiator, to obtain a spherical polymer having a diameter of from 0.1 to 1 mm. In the linear polymer co-existence method, the monomer and the linear polymer such as polystyrene are dissolved in a suitable solvent, and likewise subjected to suspension polymerization, and the linear polymer is extracted and removed from the formed polymer with a suitable solvent.

The porous polymer to be used in the present invention preferably has a polarity to some extent. Accordingly, preferred is a porous polymer composed essentially of acrylonitrile or its derivative; acrylic acid, methacrylic acid or an ester thereof; divinyl sulfone, divinyl ketone, divinyl furan, diallyl phthalate, diallyl succinate, or ethylene glycol dimethacrylate. Particularly preferred is a porous polymer composed essentially of an ester such as an acrylate, a methacrylate, diallyl phthalate, diallyl succinate, or ethylene glycol diacrylate or dimethacrylate. As a commercial product of such an ester-type porous polymer, there may be mentioned HP-2MG from Mitsubishi Chemical Industries, Ltd., or XAD-7 or XAD-8 from Rohm and Haas Co.

In the present invention, a water-insoluble substituted quinolinol is supported on the above-mentioned porous polymer, and used for the separation of gallium. Like in the case of the liquid-liquid extraction, in the present invention, gallium is believed to form a complex with the substituted quinolinol, which is then adsorbed on the porous polymer. Accordingly, as the water-insoluble substituted quinolinol, those represented by the following general formula may be employed as in the case of the conventional liquid-liquid extraction method.

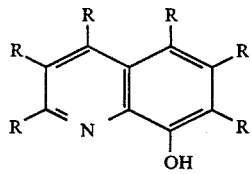

wherein R is a hydrocarbon group or a hydrogen atom.

It is preferred to employ a 7-substituted-8-quinolinol having a substituted or unsubstituted hydrocarbon group at the 7-position. As the hydrocarbon group, those having a carbon number of from 5 to 20, particularly from 8 to 20, are preferred. For instance, there may be mentioned a 1,4,4,5-tetramethylheptyl group, a 1,4,4,6,6-pentamethyl-1-heptenyl group or a 1-vinyl-3,3,5,5-tetramethylhexyl group.

In order to support the above-mentioned substituted quinolinol on the porous polymer, the substituted quinolinol is dissolved in a suitable solvent, and the porous polymer is immersed and impregnated therein.

As mentioned above, the adsorptivity of the porous polymer for gallium is dependent on the substituted quninolinol supported or retained in the polymer. Therefore, the greater the amount of the quinolinol retained in the porous polymer, the better.

A great amount of the substituted quinolinol may be retained by a method wherein the porous polymer is put in a solution of the substituted quinolinol, and then the solvent is removed by evaporation. According to this method, it is possible to retain from 0.1 to 0.6 g of the substituted quinolinol per 1 g of the polymer when the polymer is a porous polymer having a pore volume of from 0.3 to 1.2 ml/g.

The above method represents a typical method for retaining the substituted quinolinol in the porous polymer according to the present invention. However, in the present invention, the manner of retaining the quinolinol is not restricted to such a typical method, but generally covers such a manner that the substituted quinolinol is held in the porous polymer by a physical or chemical affinity other than reactions, and is not substantially eluted from the polymer by the operation of the adsorption or elution of gallium, or any other operation according to the present invention, and at least no substantial elution of the substituted quinolinol is observed by the washing with water.

According to the present invention, by means of the porous polymer having the substituted quinolinol retained therein, thus prepared, gallium is adsorbed from the aqueous solution containing gallium. The adsorption operation may be carried out in a agitation tank system. However, it is advantageous to conduct the adsorption in a column system.

The higher the operation temperature, the greater the adsorption speed. Therefore, the adsorption operation is usually conducted at a temperature of from 40° to 80° C.

Gallium adsorbed on the porous polymer is then eluted with an acidic eluting solution to recover gallium. As the eluting solution, sulfuric acid, nitric acid, hydrochloric acid or the like is usually employed. Sulfuric acid or nitric acid is employed at a concentration of at least 0.5 mol/liter, preferably at least 1 mol/liter. In the case of hydrochloric acid, if the concentration exceeds about 5 mol/liter, gallium is likely to form a chlorocomplex ion ($[GaCl_4]-$), which will then bond, by ion exchange, to the nitrogen atom of the substituted quinolinol turned into a pyridinium ion by the presence of hydrochloric acid, whereby gallium is hardly eluted. Therefore, the concentration of hydrochloric acid should be at most 5 mol/liter. Usually, the concentration of hydrochloric acid is selected within a range of from 0.1 to 5 mol/liter, particularly from 0.5 to 4 mol/liter.

In the case where the recovery of gallium in the sodium aluminate formed by a Bayer process is conducted according to the method of the present invention, aluminum as well as gallium is adsorbed on the porous polymer, and in the above-mentioned eluting method, gallium and aluminum are eluted simultaneously. To avoid the simultaneous elution, firstly the porous polymer is treated with from 0.01 to 0.1 mol/liter of sulfuric acid or nitric acid to elute aluminum, and then treated with at least 0.5 mol/liter of sulfuric acid or nitric acid to elute gallium. In the case where hydrochloric acid is used as the eluting agent, firstly the porous polymer is treated with hydrochloric acid having a concentration exceeding 5 mol/liter to elute aluminum, and then treated with hydrochloric acid having a concentration of from 0.1 to 5 mol/liter to elute gallium. Of these two-step elution methods, the former is a method in which the difference in the stability of the respective complexes of aluminum and gallium is utilized by controlling the acid concentration, whereas the latter is a method wherein the chlorocomplex ion-forming ability of gallium is utilized. By either method, aluminum and gallium can be substantially completely separated and recovered from the porous polymer. Further, in the method wherein the chlorocomplex ion-forming ability is utilized, it is also possible to use a highly concentrated aqueous alkaline solution instead of hydrochloric acid having a concentration of from 0.1 to 5 mol/liter, whereby gallium is eluted by ion exchange.

According to the present invention, the recovery of gallium from the gallium-containing aqueous solution is conducted as described above, and accordingly, the operation is simple and the loss of the water-insoluble substituted quinolinol into the aqueous phase is small as compared with the conventional liquid-liquid extraction method. Further, the present invention has a feature that the degradation of the substituted quinolinol is remarkably reduced. The reason for this is not clearly understood. However, this is believed somehow related to the fact that substituted quinolinol is fixed in the porous polymer.

Now, the present invention will be described in further detail with reference to Examples. However, it should be understood that the present invention is by no means restricted to these specific Examples.

EXAMPLE 1

A solution obtained by dissolving 2.25 g of Kelex 100 [effective component: 7-(1-vinyl-3,3,5,5-tetramethylhexyl)-8-quinolinol] of Messrs. Ashland Chemical Co. in 10 ml of acetone, was added to 15 g of Amberlite XAD-7 (a polymer of ethylene glycol dimethacrylate, particle size: 0.5 mm) i.e. a synthetic adsorber manufactured by Rohm and Haas Co. Then, while stirring the mixture, acetone was evaporated over a period of 2 hours. Then, the dried product was washed with a 3N aqueous sodium hydroxide solution and 6N hydrochloric acid, and then washed with water, and the water around XAD-7 was removed. 5 g of such XAD-7 having the substituted quinolinol retained therein, was packed in a column having inner diameter of 18 mm (the packing height: about 30 mm). After 3N sodium hydroxide was passed through the column, 10 ml of an aqueous sodium aluminate solution of 50° C. prepared in the after-mentioned manner was passed therethrough at a flow rate of 1 ml/min.

Preparation of the aqueous sodium aluminate solution

To a 3N aqueous sodium hydroxide solution, aluminum hydroxide and metal gallium were dissolved to have the respective concentrations of $Al = 0.2$ mol/liter and $Ga = 2.46 \times 10^{-3}$ mol/liter, to obtain an aqueous sodium aluminate solution containing gallium.

Then, a 3N aqueous sodium hydroxide solution and water were successively passed through the column for washing, and then gallium was eluted by passing 20 ml of 1N hydrochloric acid at a flow rate of 1 ml/min.

The gallium and aluminum concentrations in the aqueous sodium aluminate solution after the column treatment and in the eluting solution, were quantitatively analyzed by atomic-absorption spectro-photometry, whereby the adsorption rate of gallium was 100%, and the elution rate was 97.5%, whereas the adsorption rate of aluminum was 15%, and the elution rate was 97%.

By using the above-mentioned column and aqueous sodium aluminate solution, the adsorption-elution operation was repeated 9 times under the same conditions, whereby no substatial change was observed each time in the adsorption rates and elution rates of gallium and aluminum. Further, no elution of Kelex retained in the polymer was visually observed during these operations, and further no change in the outer appearance of the polymer was observed between the initial and final stages, and no color change was observed.

EXAMPLE 2

The adsorption-elution operation was conducted in the same manner as in Example 1 except that 4N sulfuric acid was used instead of hydrochloric acid in Example 1, whereby the adsorption rate of gallium was 100% and the elution rate was 99%, whereas the adsorption rate of aluminum was 14% and the elution rate was 98%.

COMPARATIVE EXAMPLE 1

100 ml of a kerosine solution containing 8% of Kelex 100 and 100 ml of the same aqueous sodium aluminate solution as used in Example 1, were mixed and stirred at 50° C. for 2 hours, and then the mixture was permitted to separate into an organic layer and an aqueous layer.

To the organic layer, 100 ml of 1N hydrochloric acid was mixed, and the mixture was stirred at 50° C. for 2 hours, and then permitted to separate into an organic layer and an aqueous layer. The gallium concentration in this aqueous layer was quantitatively analyzed, whereby the extraction rate of gallium was 80%.

By using the same extracting agent, the abovementioned extraction-reverse extraction was repeated, whereby the organic layer was gradually colored red from the fifth operation.

EXAMPLE 3

The substituted quinolinol was retained in the same manner as in Example 1 except that HP-2MG (divinyl benzene-type polymer) i.e. a synthetic adsorber manufactured by Mitsubishi Chemical Industries, Ltd. was used instead of XAD-7 in Example 1. HP-2MG having the substituted quinolinol retained therein, thus prepared, was packed in a column having an inner diameter of 9 mm to have a packing height of about 150 mm.

By using this column, the adsorption-elution operation was repeated 5 times in the same manner as in Example 1 except that the aluminum hydroxide and metal gallium concentrations in the aqueous sodium aluminate solution containing gallium were adjusted to be $Al = 1.4$ mol/liter and $Ga = 2.4 \times 10^{-3}$ mol/liter.

To examine the effects of the repetition, the gallium concentration in the aqueous sodium aluminate solution and the gallium and aluminum concentrations in the eluting solution after the column treatment in the third operation and thereafter, were quantitatively analyzed by atomic-absorption spectrophotometry, whereby the adsorption rate of gallium was at least 90% in every operation, and other results were as shown below.

| Operation cycle | Recovery rate (%)* | |
|---|---|---|
| | Ga | Al |
| 3 | 94.6 | 0.21 |
| 4 | 96.3 | 0.24 |
| 5 | 97.1 | 0.24 |

*The recovery rate is a rate relative to the gallium or aluminum in the aqueous sodium aluminate solution containing gallium.

No elution of Kelex retained in the polymer was visually observed during the above operations, and no substantial change in the outer appearance of the polymer was observed between the initial and final stages of the operations.

What is claimed is:

1. A method for recovering gallium selectively from an aqueous basic solution containing gallium, which comprises dissolving 7-substituted-8- quinolinol having a $C_5$-$C_{20}$ hydrocarbon group at the 7-position in a solvent, mixing the resulting solution with a porous polymer having a pore volume of from 0.3 to 1.2 ml/g, letting the solvent evaporate to obtain a porous polymer retaining substantially only the substituted quinolinol, filling a column with the polymer, passing the aqueous basic solution through the column to absorb gallium in the polymer and passing an aqueous acid solution through the column to elute gallium.

2. The method according to claim 1, wherein the aqueous solution containing gallium is an aqueous sodium aluminate solution formed by a Bayer process.

3. The method according to claim 1, wherein the waterinsoluble substituted quinolinol is 7-(1-vinyl-3,3,5,5-tetramethylhexyl)-8-quinolinol.

4. The method of claim 1, wherein the porous polymer is composed essentially of an acrylate, a methacrylate, diallyl phthalate, diallyl succinate, ethylene glycol diacrylate and/or ethylene glycol dimethacrylate.

5. The method according to claim 1, wherein the galliumadsorbed porous polymer is contacted with sulfuric acid or nitric acid having a concentration of from 0.01 to 0.1 mol/liter to elute aluminum, and then the polymer is contacted with sulfuric acid or nitric acid having a concentration of at least 0.5 mol/liter to elute gallium.

6. The method according to claim 1, wherein the galliumadsorbed porous polymer is contacted with hydrochloric acid having a concentration of more than 5 mol/liter to elute aluminum, and then the polymer is contacted with hydrochloric acid having a concentration of from 0.1 to 5 mol/liter to elute gallium.

* * * * *